United States Patent [19]

Muterel

[11] Patent Number: 4,505,519
[45] Date of Patent: Mar. 19, 1985

[54] BRAKING SYSTEM FOR AUTOMOBILE VEHICLE FORMED BY A TRACTOR AND A TRAILER

[75] Inventor: Roland Muterel, Bessancourt, France

[73] Assignee: Societe Anonyme D.B.A., Paris, France

[21] Appl. No.: 625,196

[22] Filed: Jun. 28, 1984

Related U.S. Application Data

[63] Continuation of Ser. No. 338,802, Jan. 11, 1981, abandoned.

[30] Foreign Application Priority Data

Jan. 30, 1981 [FR] France .................. 81 01834

[51] Int. Cl.³ ............................................. B60T 11/20
[52] U.S. Cl. ...................... 303/6 A; 60/562; 60/567; 60/581; 188/345; 188/354; 303/7
[58] Field of Search .............. 188/345, 354; 303/6 A, 303/7; 60/562, 567, 581, 589; 244/111; 180/6.2

[56] References Cited

U.S. PATENT DOCUMENTS

| 2,266,817 | 12/1941 | Schober | 188/354 X |
|---|---|---|---|
| 2,652,904 | 9/1953 | Whitten | 303/7 |
| 2,717,745 | 9/1955 | Carter | 188/354 |
| 2,741,337 | 4/1956 | Ziskal | 188/354 |
| 2,911,168 | 11/1959 | Moreland | 303/6 A |
| 3,339,986 | 9/1967 | Lowin et al. | 188/354 X |
| 3,386,775 | 6/1968 | Jones | 188/16 X |
| 3,640,067 | 2/1972 | Ingram | 188/345 X |
| 3,863,991 | 2/1975 | Wilson | 303/6 A |

FOREIGN PATENT DOCUMENTS

| 2249789 | 5/1975 | France . | |
| 2383807 | 11/1978 | France | 60/589 |
| 383462 | 11/1932 | United Kingdom | 188/354 |
| 488771 | 7/1938 | United Kingdom | 60/562 |

Primary Examiner—George E. A. Halvosa
Attorney, Agent, or Firm—Larry J. Palguta; Ken C. Decker

[57] ABSTRACT

According to the invention, the braking system includes two tandem master cylinders (100, 200), the first (100) having a first pressure chamber (110) connected to the left brake (132) of the tractor and a second pressure chamber (112) connected to the trailer brakes (300), and the second having a first pressure chamber (210) connected to the right brake (232) of the tractor and a second pressure chamber (212) likewise connected to the trailer brakes (300). The invention may be utilized with certain vehicles, in particular agriculture tractors.

8 Claims, 3 Drawing Figures

FIG_1

FIG_2

BRAKING SYSTEM FOR AUTOMOBILE VEHICLE FORMED BY A TRACTOR AND A TRAILER

This is a continuation of co-pending application Ser. No. 338,802 filed Jan. 11, 1982, now abandoned.

This invention relates to braking systems for automobile vehicles formed by a tractor and a trailer.

On certain vehicles, particularly for agricultural use, it is common to provide three braking circuits, the first serving one or more brake motors associated with one or more wheels located on one side of the tractor, the second serving one or more brake motors associated with one or more wheels located on the other side of the tractor and the third serving the brake motors associated with the wheels of the trailer. Pressurization of these circuits is ensured by means of two generators, commonly called master cylinders, of which the control pedals can be actuated either separately or simultaneously.

The finality of such systems is to be able to ensure braking of the wheels of only one side of the tractor in order to assist changes in direction of the latter, by actuation of only one of the two master cylinders, or to be able to ensure braking of both sides of the tractor in order to decelerate the latter in a conventional manner, by simultaneous actuation of the two master cylinders, of which the two pedals are then coupled together.

In the latter case, to ensure equal braking of both sides of the vehicle, it is appropriate to render equal the braking pressures arising from the two master cylinders. This is usually ensured by means of pressure balancing assemblies.

Further, as far as the trailer is concerned, it is sought to ensure braking of the latter only during deceleration braking of the tractor.

A braking system is known from the French patent published under the number 2 249 789, for such a vehicle, of the type including two master cylinders, connected one to a left wheel brake and the other to a right wheel brake of the tractor, which can be actuated either individually for the purpose of steering of the vehicle, or together for the purpose of braking of the vehicle. To ensure equalization of the pressures between the two master cylinders and control braking of the trailer, this system includes further a pressure generating cylinder containing a pilot piston for the trailer wheel brakes, which piston is returned by a spring, and an equaliser piston for the master cylinders, these two pistons delimiting between them a common pressure chamber which is connected to one of the master cylinders, while the equalizer piston delimits in another direction a further pressure chamber connected to the other master cylinder.

Such a braking system exhibits the following disadvantages:

Firstly, each time one proceeds to actuation of a single master cylinder for the purpose of steering of the tractor, braking of the trailer is produced, which opposes the effect sought after. Secondly, in case of simultaneous breakdown of the two braking circuits of the tractor, which may happen when, following repeated braking, the brake fluid comes to the boil, a phenomenon known under the name of "vapor lock", there is total loss of braking, including braking of the trailer.

To palliate these disadvantages, the present invention proposes a braking system, for an automobile vehicle formed by a tractor and a trailer, including two master cylinders, connected one to a left wheel brake and the other to a right wheel brake of the tractor, which can be actuated either individually for the purpose of steering of the vehicle, or together for the purpose of braking of the vehicle, said system further including a pressure balancing assembly and a pressure generating cylinder connected to the trailer wheel brakes, characterized in that said master cylinders consist of two tandem master cylinders, the first master cylinder having a first chamber connected to the left wheel brake of the tractor and a second chamber connected to the trailer wheel brakes; and the second master cylinder having a first chamber connected to the right wheel brake of the tractor and a second chamber connected to the trailer wheel brakes.

The invention will now be described referring to the attached drawings, in which:

Figure 3 illustrates in detail master cylinder 200 which is idential in structure and operation to master cylinder 100, the numerals of the idential components being increased by 100 in Figure 3.

Figure 1:
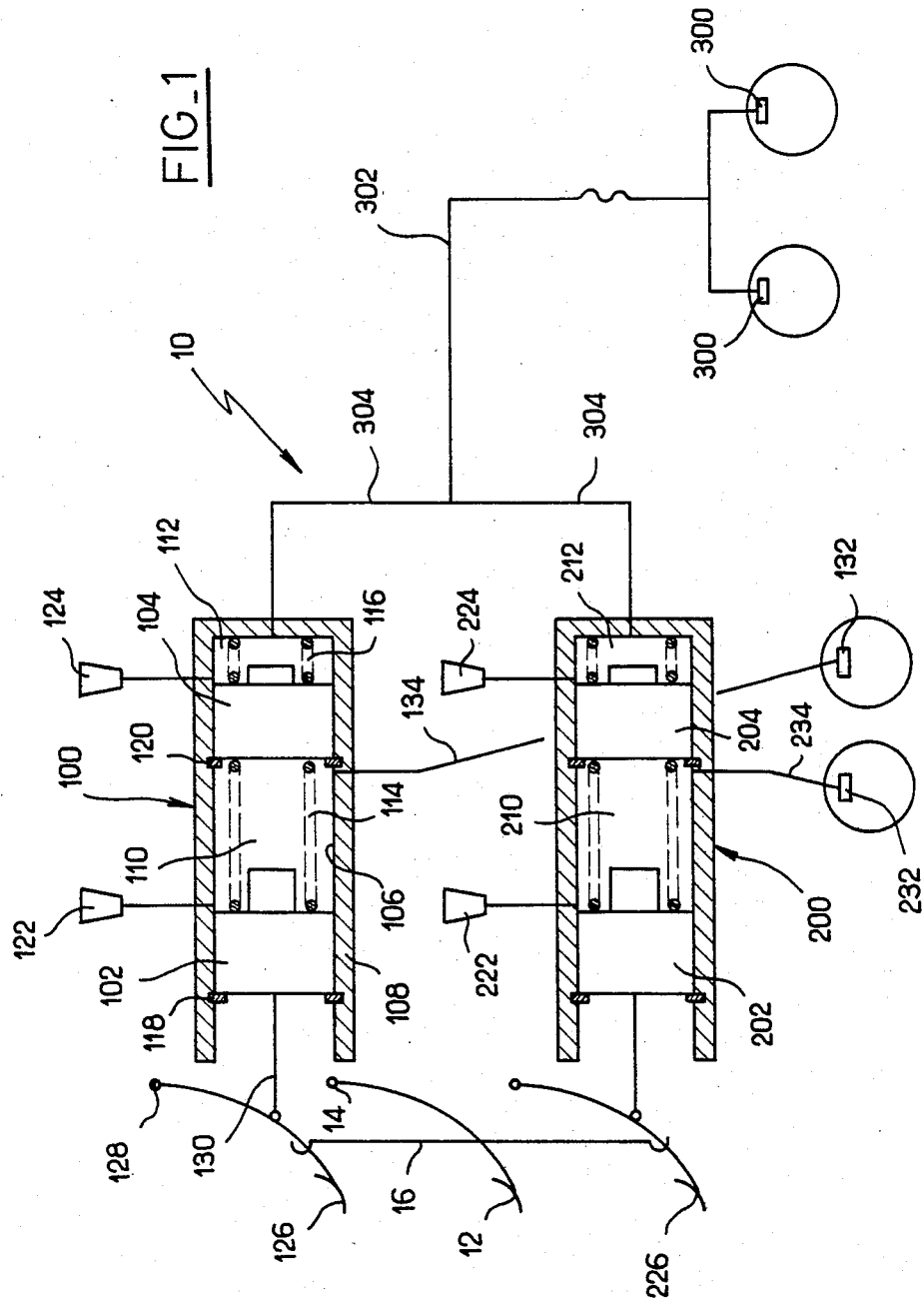
FIG. 1 is a schematic view of a braking system according to the invention, for a vehicle composed of a tractor and a trailer.

The braking system 10 shown in FIG. 1 is composed of two master cylinders 100 and 200, of the tandem type, of identical construction and mounting on the tractor.

The master cylinder 100 includes two pistons 102 and 104 mounted slidingly in a bore 106 of a housing 108 and defining a first pressure chamber 110 and a second pressure chamber 112. Two springs 114 and 116 return the pistons 102 and 104 to a rest position in contact with two stops 118 and 120 respectively, a position in which the pressure chambers are in communication with reservoirs 122 and 124.

A pedal 126, articulated at 128, is capable of displacing the piston 102 through a push rod 130 for setting the master cylinder in operation.

The master cylinder 200 including the same components will not be described in detail.

To set the two master cylinders 100 and 200 in operation simultaneously, there is provided a third pedal 12 articulated at 14 and bearing a transverse bar 16 capable of driving simultaneously the two pedals 126 and 226 during depression of the pedal 12.

This device has been provided only by way of indication and will be capable of being replaced by any equivalent device capable of driving the two pedals 126 and 226 simultaneously by depression of a single pedal.

The tractor comprises a left wheel brake 132 connected by a pipe 134 to the first pressure chamber 110 of the master cylinder 100, and a right wheel brake 232, connected by a pipe 234 to the first pressure chamber 210 of the master cylinder 200.

The trailer comprises wheel brakes 300 connected by pipes 302 and 304 at the same time to the second pressure chamber 112 of the master cylinder 100 and to the second pressure chamber 212 of the master cylinder 200. In a variant, not shown, the circuit serving the trailer may be equipped with an assistance device.

Figure 2:
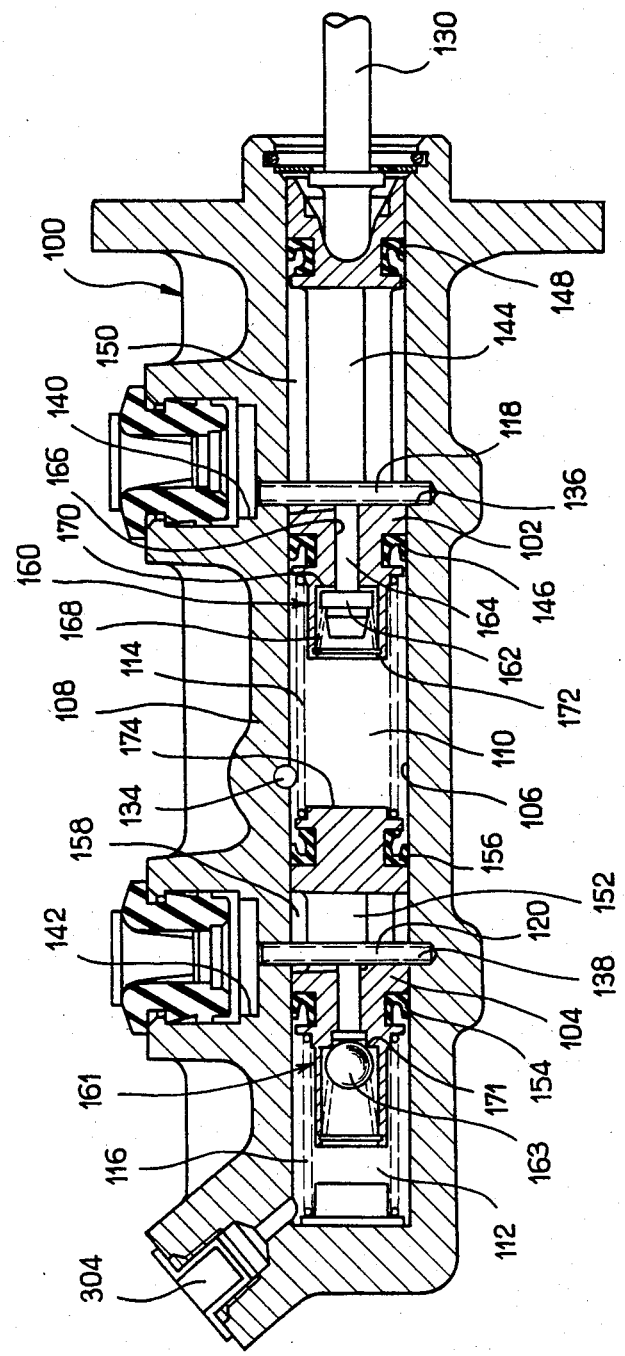
Figures 2 and 3 are longitudinal sectional views of master cylinders usable in a system such as shown in FIG. 1.
Figure 3:
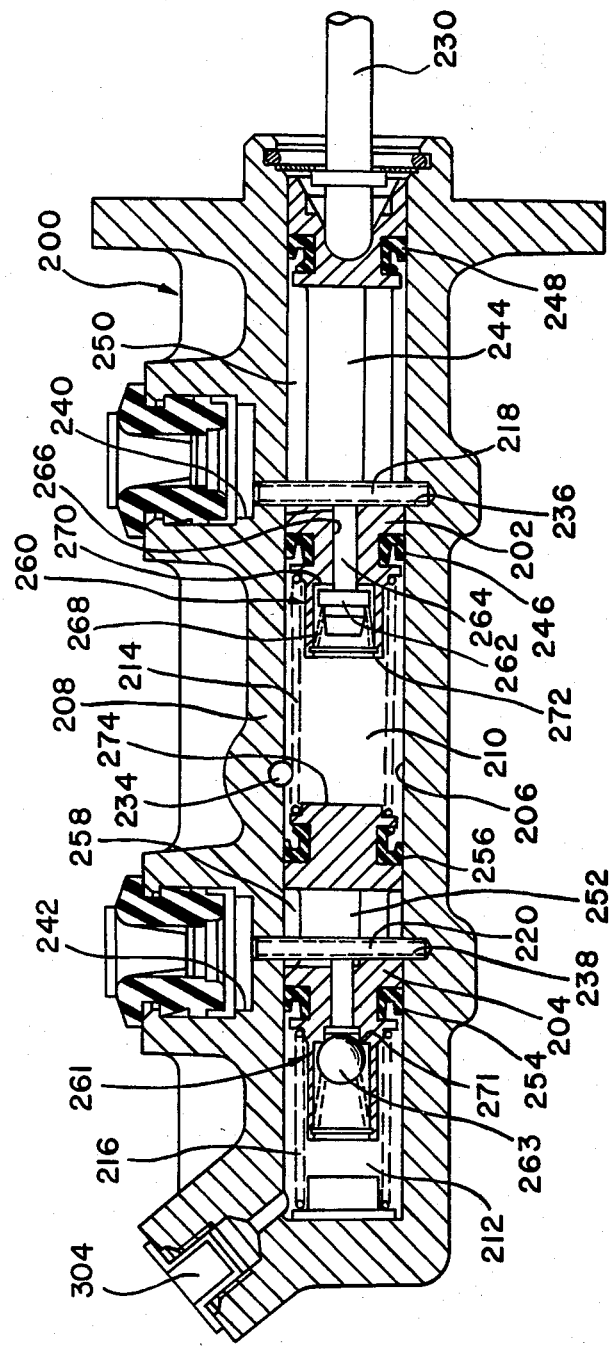

In FIG. 2, an embodiment of a master cylinder particularly adapted within the scope of the present invention has been shown. The components already described referring to FIG. 1 bear the same references, notably the housing 108, the bore 106, the pistons 102 and 104, the pressure chambers 110 and 112, the return springs 114 and 116, the stops 118 and 120 and finally the push rod 130.

In this embodiment, the stops 118 and 120 are effected by two cylindrical pins split lengthwise and force fitted in openings 136 and 138 approximately perpendicular to the bore 106 and passing into connecting orifices 140 and 142, which ensure connection of the master cylinder 100 to the reservoirs 122 and 124 shown in FIG. 1.

The piston 102 comprises a longitudinal groove 144 into which projects the pin 118 and defining with the bore 106, between two rings 146 and 148, a first re-supply chamber 150. In the same way, the piston 104 comprises a longitudinal groove 152 into which projects the pin 120 and defining with the bore 106, between two rings 154 and 156, a second re-supply chamber 158. In the pistons 102 and 104 are mounted two check valves 160 and 161 which control communication between the pressure chambers 110 and 112 and the re-supply chambers 150 and 158 respectively.

The first check valve 160 comprises a closure element 162 of elastomeric material carried by a stem 164 mounted slidingly in a passage 166 of the piston 102, while allowing free flow to fluid between the stem and the passage. A spring 168 returns the closure element 162 in the direction of a seat 170 formed on the piston. In the rest position of the piston 102, the stem 164 comes into abutment against the pin 118 and the closure element 162 is disengaged from the seat 170, the first re-supply chamber 150 thus being in communication with the first pressure chamber 110.

The second check valve 161 is practically identical with the first and all common components bear the same reference number, increased by one unit. The only difference resides in the closure element 163, which is made of rigid material for reasons which will be explained below.

Finally, the piston 102 comprises an axial projection 172 capable of engaging the rear end 174 of the piston 104 as will be explained later.

Operation of the braking system thus described is as follows:

When only the "left" master cylinder 100 is set in operation, by depression of the pedal 126, the push rod 130 displaces the piston 102 towards the interior of the first pressure chamber.

During a first period, the closure element 162 of the check valve 160 comes into contact with its seat 170, thus cutting off the first re-supply chamber 150 from the first pressure chamber 170. The fluid compressed in the latter exerts on the second piston 104 a force which induces displacement of the latter towards the interior of the second pressure chamber 112. In the same way, the closure element 163 of the second check valve comes into contact with its seat 171, cutting off the second re-supply chamber 158 from the second pressure chamber 112.

During a second period, when depression of the pedal 126 is continued, it is ascertained that the fluid contained in the second pressure chamber 112 flows without resistance into the pipe 304, then into the second pressure chamber 212 of the "right" master cylinder 200, and through the valve 261 which is in the open position, is caused to flow back into the reservoir 224. There is therefore simultaneous displacement of the two pistons 102 and 104 without compression of the fluid in the first pressure chamber 110, until the piston 104 comes into abutment with the bottom of the bore 106.

Finally, during a third period, the first piston 102 moves alone, compressing the fluid contained in the first pressure chamber 110. This pressurised fluid flows into the pipe 134 as far as the left brake motor 132 of the tractor, which, by reason of braking of the left wheel which results therefrom, induces turning to the tractor to the left.

It is noted that the embodiment of the check valves 161 and 261 must meet a particular criterion.

In effect, as has just been seen, when only the master cylinder 100 is set in operation, the brake fluid is expelled from the chamber 112 as far as the reservoir 224. It is therefore important that the closure element 263 of the check valve 261 remains removed from its seat 271 and that the flow of fluid does not risk inducing closure of this check valve. For this reason, it has been chosen to make the closure element 263 of rigid material in order to avoid this risk.

It can be conceived that other embodiments of check valves 161 and 261 will be able to be selected without departing from the scope of the present invention. For obvious reasons, these remarks apply likewise to the check valve 161 of the first master cylinder 100.

Symmetrically, setting operation of only the "right" master cylinder 200 induces braking of the right wheel brake 232 and turning of the tractor to the right.

In one case as in the other, it is observed that the trailer wheel brakes are not supplied. In fact, in case of "directional" braking, it would be inopportune to control braking of the trailer, which would oppose the result sought after.

When the two master cylinders are set in operation simultaneously by depression of the pedal 12, the two first pistons 102 and 202 move simultaneously towards the interior of the first pressure chamber 100 and 210, inducing closure of the valves 160 and 260; then, the two second pistons 104 and 204 move simultaneously towards the interior of the second pressure chambers 112 and 212, inducing closure of the valves 161 and 261.

When depression of the pedal 12 is continued, the four pressure chambers 110, 210, 112 and 212 are pressurized and deliver fluid under pressure, the first two to the left and right wheel brakes of the tractor separately and the second two to the trailer wheel brakes together. The wheel brakes of the vehicle all being supplied, braking of the latter therefore follows.

The two second chambers 112 and 212 being in mutual communication, there prevails therefore in these two chambers an identical pressure, and, consequently, there prevails likewise an identical pressure in the first chambers 110 and 210. In fact, if for various reasons the pressure prevailing in the first chamber 110 tends to increase more rapidly than that prevailing in the other first chamber 210, equalization of pressure between the two chambers 110 and 112 is produced by displacement of the piston 104 towards the latter and equalization of pressure between the two chambers 212 and 210 by displacement of the piston 204 towards the latter.

The right and left wheel brakes of the tractor being supplied with equal pressures, the directional stability of the vehicle is ensured during braking of the vehicle by simultaneously setting the two master cylinders in operation.

The behaviour of the braking system in case of failure of the various circuits will now be examined:

1. Failure of "trailer" circuit:

Such a failure has no effect on directional braking actions (setting only one master cylinder in operation).

When both master cylinders are set in operation, the two pistons 104 and 204 move together until they come into abutment with the bottom of the bores 106 and 206 respectively. The pistons 102 and 202 then compress the fluid in the chambers 110 and 210 respectively. There is then braking of the right wheel and of the left wheel of the tractor simultaneously. It is however ascertained that there is not longer equalization of the right/left braking pressures, but that the braking capacity of the tractor is completely preserved.

Remark: when the tractor is used without trailer, the pipe 302 for distribution to the trailer wheel brakes is simply blocked. In this way, there is equalisation of the right/left braking pressures of the tractor since the chambers 112 and 212 are in mutual communication as has already been seen.

2. Failure of one of the tractor circuits:

Let us suppose that such a failure concerns the circuit 234 supplying the right wheel brake of the tractor. On depression of the pedal 12, no pressure is apparent in the pressure chamber 210 during advance of the piston 202. On the other hand, in the first master cylinder 100, displacement of the piston 102 induces pressurization of the pressure chamber 110 and braking of the left wheel of the tractor once the piston 104 has reached the bottom of the bore 106, the brake fluid initially contained in the pressure chamber 112 having been expelled towards the reservoir 224 through the pressure chamber 212 and valve 261 since the piston 204 remains stationary, as has already been seen.

Furthermore, when the pedal 12 has been depressed sufficiently, joint displacement of the two pistons 102 and 202 brings the latter into contact with the piston 204. Any supplementary displacement of the pedal 12 induces direct driving of the piston 204 by the piston 202 and supply of the trailer wheel brakes from the pressure chamber 212.

3. Failure of both tractor circuits:

Before studying the behavior of the system in this eventually, first of all the reasons for which such a failure may be produced will be examined. In effect, it is ascertained in practice that a double failure is an extremely rare phenomenon and the various international regulations require that only one failure is envisaged in the definition and dimensioning of the braking systems. It is however appropriate to realize that the vehicles envisaged in the present application frequently move about at the limit of total weight authorised while moving, or even beyond this limit. In these circumstances, the tractor brakes are acted upon to a point such that heating thereof induces boiling of the brake fluid, a phenomenon known under the name of "vapor lock". A discriminating analysis allows it to be ascertained that this phenomenon is produced first of all in one of the braking circuits which then loses its braking capacity. The braking force at the pedal then serves entirely to compress the brake fluid in the intact circuit. The brake which is intact and already brought to a high temperature then momentarily ensures braking which is practically double that which it ensured before. Its temperature then rises very rapidly and the phenomenon of "vapor lock" is likewise produced in this circuit a few moments later. The braking system then behaves in the following manner: the two pistons 102 and 202 move simultaneously without resistance until they come into contact with the two pistons 104 and 204. The force at the pedal 12 then serves to compress the brake fluid in the second chambers 112 and 212, braking of the trailer therefore being ensured even in case of failure of both braking circuits of the tractor.

Finally, although the resevoirs 124 and 224 have been shown separate, it will be preferred to construct them in the form of a single reservoir.

In effect, in case of repeated directional braking in the same direction, for example to the right by setting in operation the master cylinder 200, the fluid expelled from the pressure chamber 212 towards the reservoir 124 can return to this pressure chamber only after a certain time lapse, due to the multiple obstacles met with by the fluid; there is therefore a risk of reducing the content of and even emptying the reservoir 224. This disadvantage is avoided if the two reservoirs constitute only a single reservoir.

What is claimed is:

1. A braking system for an automotive vehicle formed of a tractor and a trailer, which comprises:
   a pair of tractor brakes associated respectively to paired left and right wheels of the tractor;
   at least a pair of trailer brakes associated respectively to pair left and right wheels of the trailer;
   first and second tandem master cylinders each including first and second pressure chambers separated one from the other by a piston, said master cylinders being manually operable independently or simultaneously;
   said first master cylinder having its first chamber connected to the left tractor brake of said pair of tractor brakes, said second master cylinder having its first chamber connected to the right tractor brake of said pair of tractor brakes, said second chambers of said master cylinders being directly and permanently connected jointly to one another and both trailer brakes of said pair of trailer brakes, thereby ensuring pressure balance between the left and right tractor brakes when braking all wheels of the vehicle.

2. The braking system according to claim 1, characterized in that each of said master cylinders includes a housing penetrated by a bore, two pistons mounted slidingly in said bore and delimiting in the latter of said first and second pressure chambers, two reservoirs being in communication with said bore and said pistons each controlling, respectively, the flow of fluid between said reservoirs and said pressure chambers, said pistons being returned by elastic means toward a rest position and in contact with two stops, a position in which said pressure chambers communicate with said reservoirs.

3. The braking system according to claim 2, characterized in that each of said master cylinders includes two check valves controlled by said pistons and controlling the flow of fluid between the respective reservoirs and pressure chambers.

4. The braking system according to claim 3, characterized in that in each of said master cylinders one of said check valves which controls the flow of fluid between the corresponding reservoir and second pressure chamber comprises a closure element of rigid material.

5. The braking system according to any one of claims 2 to 4, characterized in that the two reservoirs connected to said second pressure chambers constitute a single reservoir.

6. The braking system in accordance with claim 2, wherein each of the stops comprises a split cylindrical pin disposed in an opening for the communication between the associated reservoir and pressure chamber, whereby the pin provides a stop for the associated piston while providing said communication.

7. A braking system for an automotive vehicle comprising a self-propelled vehicle and a trailer, the system comprising:

a pair of self-propelled vehicle brakes and vehicle brake circuits associated with respective left and right wheels of the vehicle;

a pair of trailer brakes associated with respective left and right wheels of the trailer;

first and second tandem master cylinders each including first and second pressure chambers separated one from the other by a piston, said master cylinders being operable independently or simultaneously;

the first master cylinder having its first chamber connected by a brake circuit to the left vehicle brake of said pair of vehicle brakes, said second master cylinder having its first chamber connected by a brake circuit to the right vehicle brake of said pair of vehicle brakes, and the second chambers of said master cylinders being in direct and joint permanent communication with one another and with said trailer brakes, whereby the trailer brakes are actuable upon failure of one or both of the vehicle brake circuits and the braking system effects an equalization of pressures communicated to the left and right vehicle brakes during braking of all of the wheels of the automotive vehicle.

8. The braking system according to claim 7, wherein each master cylinder includes a housing penetrated by a bore, two pistons mounted slidingly in said bore and delimiting in the latter of said first and second pressure chambers, reservoir means in communication with said bore and said pistons each controlling, respectively, the flow of fluid between said reservoir means and pressure chambers and elastic means for returning said pistons toward a rest position and in contact with two stops wherein the pressure chambers communicate with said reservoir means, the stops each comprising a split cylindrical pin disposed in an opening for the communication between the reservoir means and pressure chamber, the pin providing a stop for the associated piston while providing said communication.

* * * * *